(12) United States Patent
Sanchez

(10) Patent No.: US 6,604,480 B1
(45) Date of Patent: Aug. 12, 2003

(54) FAST CURRENT RESCUE BOAT

(76) Inventor: Alfred T. Sanchez, P.O. Box 114, Peralta, NM (US) 87042

( * ) Notice: Subject to any disclaimer, the term of this patent is extended or adjusted under 35 U.S.C. 154(b) by 0 days.

(21) Appl. No.: 10/123,636

(22) Filed: Apr. 16, 2002

(51) Int. Cl.[7] .................. B63H 25/22; B63H 11/107
(52) U.S. Cl. ................................ 114/150; 440/40
(58) Field of Search ............................. 114/122, 150, 114/151; 440/38, 40, 43; 441/80

(56) References Cited

U.S. PATENT DOCUMENTS

| | | |
|---|---|---|
| 1,244,123 A | 10/1917 | Odabasian |
| 2,745,370 A | 5/1956 | Manis |
| 2,960,958 A | 11/1960 | Doulgheridis |
| 3,854,437 A * | 12/1974 | Stansbury .................. 440/43 |
| 3,865,067 A | 2/1975 | Archer |
| 3,934,538 A * | 1/1976 | Canazzi .................... 440/43 |
| 3,941,074 A * | 3/1976 | Millerbernd ............... 114/344 |
| 4,217,846 A | 8/1980 | Wight |
| 4,756,698 A | 7/1988 | Gorg |
| 4,976,642 A * | 12/1990 | Wilkie .................... 441/131 |
| 4,986,204 A | 1/1991 | Yoshida |
| 5,249,910 A * | 10/1993 | Ball ....................... 414/538 |
| 5,315,950 A | 5/1994 | Abel |

* cited by examiner

*Primary Examiner*—S. Joseph Morano
*Assistant Examiner*—Andrew Wright
(74) *Attorney, Agent, or Firm*—Dennis F. Armijo

(57) ABSTRACT

A remotely controlled rescue craft for use in fast moving water to rescue victims. A line is strung and secured across the moving water and the craft is tethered to the line. The craft has a water passage port that runs through the length of the craft. Within the passage port are a remotely controlled rudder for steering the craft, and at least one remotely controlled stabilization plate for controlling the pitch of the craft. Pressure relief channels run from the passage port to each side of the craft to keep the craft from rocking from side to side. A sealing ball is in each pressure relief channel and is pressed against a seal in an opening in the channel when the channel fills with water. A remotely deployed life preserver can also be onboard the craft. A control box controls all the onboard systems.

14 Claims, 5 Drawing Sheets

FAST CURRENT RESCUE BOAT

BACKGROUND OF THE INVENTION

1. Field of the Invention (Technical Field)

The invention relates to water craft for use in fast moving waters and more particularly to a remote control water craft for rescuing flood victims without putting the rescuers in danger.

2. Background Art

There are few systems for rescuing people under hazardous flood conditions such as in canals, rivers or arroyos or anywhere there is uncontrolled flooding and a potential for loss of life due to drowning. Presently, ropes or a net are strung across a river or canal in attempts to rescue flood victims being washed down current. Other presently used techniques require rescuers, in motorized boats, or rescuers tethered to a fixed object, attempt to swim to or float to a flood victim. Helicopters are also used to affect the rescue of flood victims. Motorized boats have to fight the current and put rescuers and flood victims in harms way. Rescuers tethered and allowed to enter the current or flooded area are also at risk. Helicopters are not always available and are limited to flying conditions. All of the state of the art approaches puts rescuers in danger of becoming a flood victim themselves.

SUMMARY OF THE INVENTION
(DISCLOSURE OF THE INVENTION)

In accordance with the present invention, there is provided an apparatus and method for steering and stabilizing a water craft for use in fast flowing water. The water craft uses moving water to steer and stabilize said water craft comprising a water passage port disposed lengthwise within the water craft, a steering rudder affixed to at least one vertical wall of the water passage port, at least one stabilization plate affixed to at least one horizontal wall of the water passage port and a water craft anti:rocking stabilization assembly comprising at least one first pressure relief channel comprising a first end disposed on the vertical wall and a second end disposed on a first side of the water craft and at least one second pressure relief channel comprising a first end disposed on the vertical wall and a second end disposed on a second side of the water craft and a first moveable ball disposed within the first pressure relief channel and a second moveable ball disposed within the second pressure relief channel. The steering rudder and the at least one stabilization plate preferably comprise a remotely controlled actuator. The at least one stabilization plate preferably comprises a front stabilization plate and a rear stabilization plate. The at least one first and second pressure relief channels preferably comprise a ball seal. The first and second moveable balls preferably comprise buoyant moveable balls. The water craft can also include a remotely controlled deployable life preserver. The water craft can also have handrails affixed to the water craft. The water craft can also have wheels affixed to an undercarriage of the water craft.

The method for steering and stabilizing a water craft with flowing water comprises the steps of providing a water passage port disposed lengthwise within the water craft, steering the water craft with a rudder affixed to at least one vertical wall of the water passage port, stabilizing the water craft with at least one stabilization plate affixed to at least one horizontal wall of the water passage port and further stabilizing the water craft with an anti:rocking pressure relief stabilization assembly. The preferred step of further stabilizing the water craft with an anti:rocking pressure relief stabilization assembly comprises sealing a moveable ball in a pressure relief channel end by pressure created by water entering into the pressure relief channel. The method can also include the step of moveably affixing the water craft to a main support cable. The steps of steering the water craft and stabilizing the water craft with at least one stabilization plate preferably comprises remotely steering and stabilizing. The step of remotely steering and stabilizing preferably comprises remotely controlling the rudder and the at least one stabilization plate. The step of stabilizing the water craft with at least one stabilization plate comprises stabilizing a front of the water craft with a front stabilization plate and a rear of the water craft with a rear stabilization plate.

The preferred method of rescuing a victim from fast flowing water, using the flowing water to steer and stabilize the water craft, comprising the steps of traversing the water with a main support cable, moveably affixing the water craft to the main support cable, steering the water craft with a steering rudder rotatably affixed within a water passage port toward the victim, stabilizing the water craft with at least one stabilization plate rotatably affixed within the water passage port and providing an onboard apparatus for the victim to grasp. The steps of steering and stabilizing preferably comprise remotely controlling the steering rudder and the at least one stabilization plate. The step of providing an onboard apparatus for a victim to grasp can comprise the step of remotely deploying a life preserver. The step of providing an onboard apparatus for a victim to grasp can also comprise the step of providing hand rails on said water craft. The method can also comprise tethering a rescuer to the water craft. The method can also comprise maneuvering the water craft to a shore.

A primary object of the present invention is to provide a rescue system for flood victims without placing the rescuers in jeopardy.

Another object of the present invention is to provide a remotely controlled rescue craft.

Yet another advantage of the present invention is to provide an unmanned water craft that is maneuverable.

Another object of the present invention is to use the moving water for maneuvering and stabilizing the water craft.

A primary advantage of the present invention is that it has a passage port that runs through the water craft for steering, and front and back stabilization.

Another advantage of the present invention is that the ball sealing pressure relief channels controls side to side rocking of the water craft.

Yet another advantage of the present invention is that the water craft has a remotely controlled deployable life preserver.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
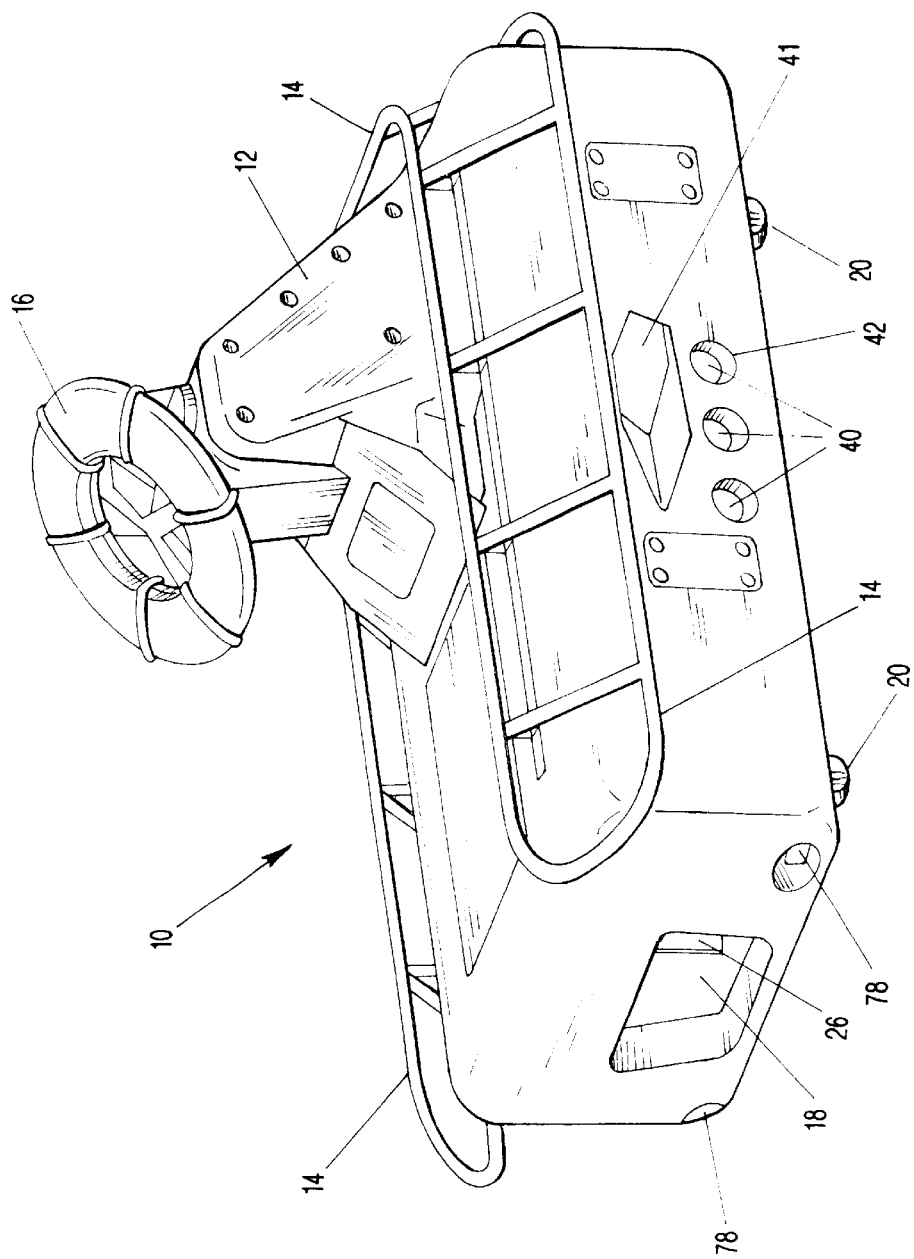
FIG. 1 is a rear perspective view of the referred fast current rescue boat.
Figure 2:
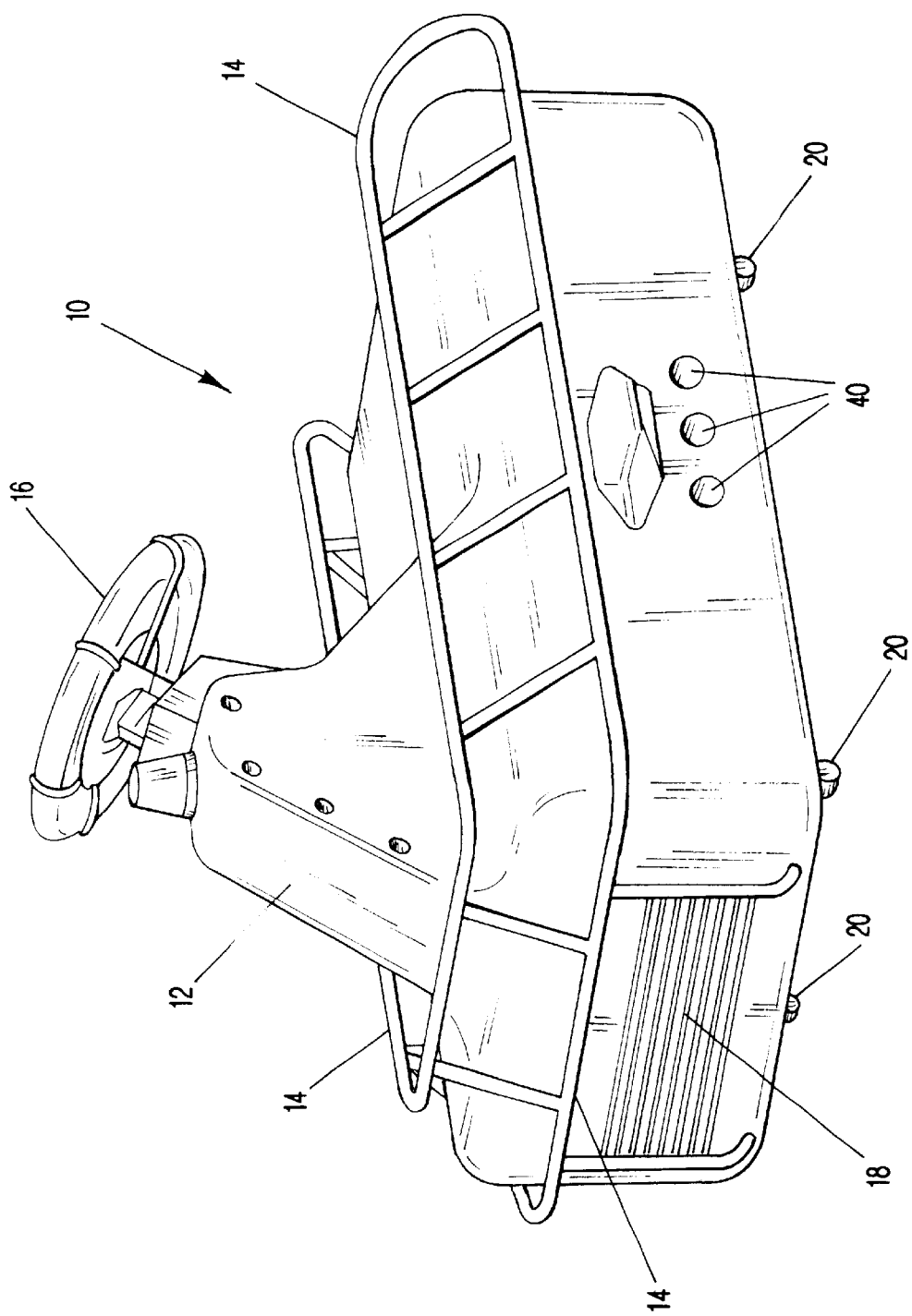
FIG. 2 is a front perspective view of the referred fast current rescue boat.

The Fast Current Rescue Boat (FCRB), with it's trailer, is a self-contained rescue system for use in fast flowing waters. FIGS. 1 and 2 show perspective views of the preferred embodiment. A trailer for hauling the FCRB can carry all of the necessary rigging needed to deploy the FCRB (not shown). The FCRB 10 is constructed of a metal frame with a fiberglass body 12 with handrails 14 mounted on its periphery. A remotely deployed life preserver 16 is included. The present invention incorporates a water passage port 18 that runs through the entire length of the craft 10. Water flow through passage port 18 is used to stabilize and control craft 10 when it is in the water. The FCRB also preferably has wheels 20 mounted on its undercarriage for ease of handling and deployment. The preferred wheels are swivel type wheels. One or more 4.0 inch diameter weight stabilization tubes 78 can be incorporated in the construction of the FCRB. This comprises a tube that runs the entire length of the FCRB and preferably has a cap on each end and is used as a compartment for ballast.

Figure 3:
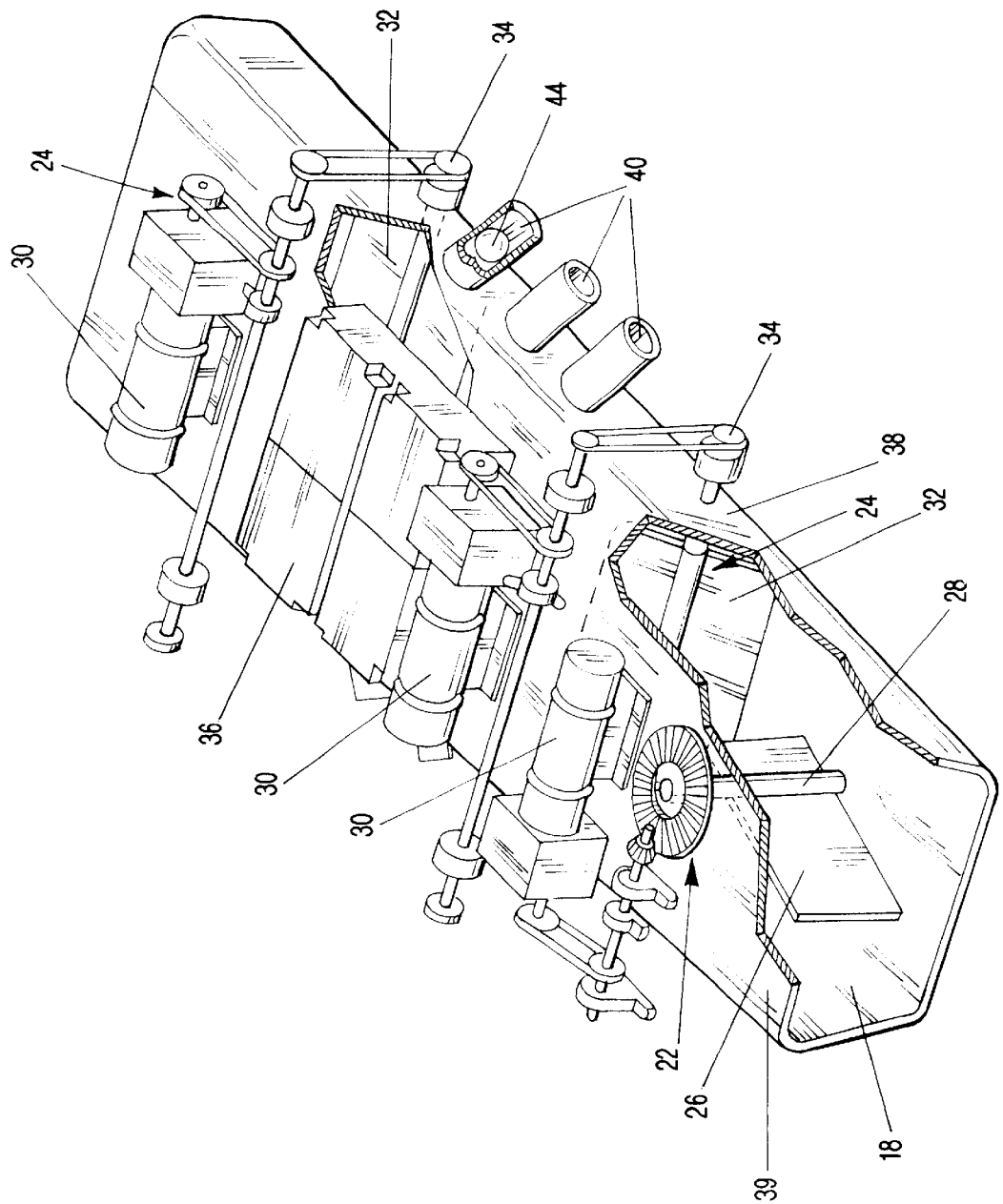
FIG. 3 depicts the preferred steering and stabilization assemblies and the preferred pressure relief channels.

The FCRB 10 does not have a motor or other device for propulsion. It is propelled by the moving water. The moving water is also used for steering and stabilization. FIG. 3 shows the preferred water passage port 18., steering mechanism 22, and stabilization assemblies 24. Steering the FCRB is accomplished by the flowing water moving through passage port 18 which is directed from side to side by a rudder 26. Rudder 26 is affixed to the back end water passage horizontal port wall 39 with a rudder axle 28, as shown, allowing rudder 26, to move from side to side, thereby steering the craft. Movement of the rudder 26 is accomplished with a battery operated motor 30 that is preferably remotely controlled.

The FCRB is stabilized using at least one stabilization assembly 24. However, the preferred embodiment has two stabilization assemblies 24, one for stabilizing the front of the FCRB and a second for stabilizing the rear of the FCRB. Each stabilization assembly 24 comprises a stabilization plate 32 for directing water up and down within water passage port 18. Each stabilization plate 32 is affixed to the passage port vertical wall 38 with a stabilization axle 34, as shown, allowing each stabilization plate 32, to move up and down. Movement of the stabilization plates 32 is similarly accomplished with a battery operated motor. 30 that is preferably remotely controlled. The front stabilization plate controls the pitch of the front of the FCRB while the rear stabilization plate controls the pitch of the rear portion of the FCRB. Batteries 36 for operating motors 30 can be mounted to the passage port horizontal wall 39 as shown, or in another appropriate location. The preferred craft has motors with a system of gears, shafts, and chains, or the like, for controlling the stabilizer plates 32 and the rudder 26. Additional stabilization can be accomplished with outriggers 41 placed on either side of the FCRB as shown on FIG. 1. Outriggers 41 can be configured and sized to meet the specific requirements for each FCRB.

FIG. 3 also shows the preferred pressure relief channels 40. Pressure relief channels 40 have been incorporated in the sides of the FCRB to eliminate side to side rocking. Although three pressure relief channels 40 are shown on each side of the FCRB, fewer or more channels can be added, if desired. These pressure relief channels 40 run from the water passage port 18 to the outside of the FCRB 42. These pressure relief channels 40 are preferably constructed of aluminum tubing with a buoyant ball 44 used as a sealing device inside of the tubing. Ball 44 is normally in a free state within the channel 40. When the FCRB leans too far to the side, water is let into the channel 40 and the pressure of the water causes ball 44 to seal against the opening of the channel thereby controlling side to side stability.

Figure 4:
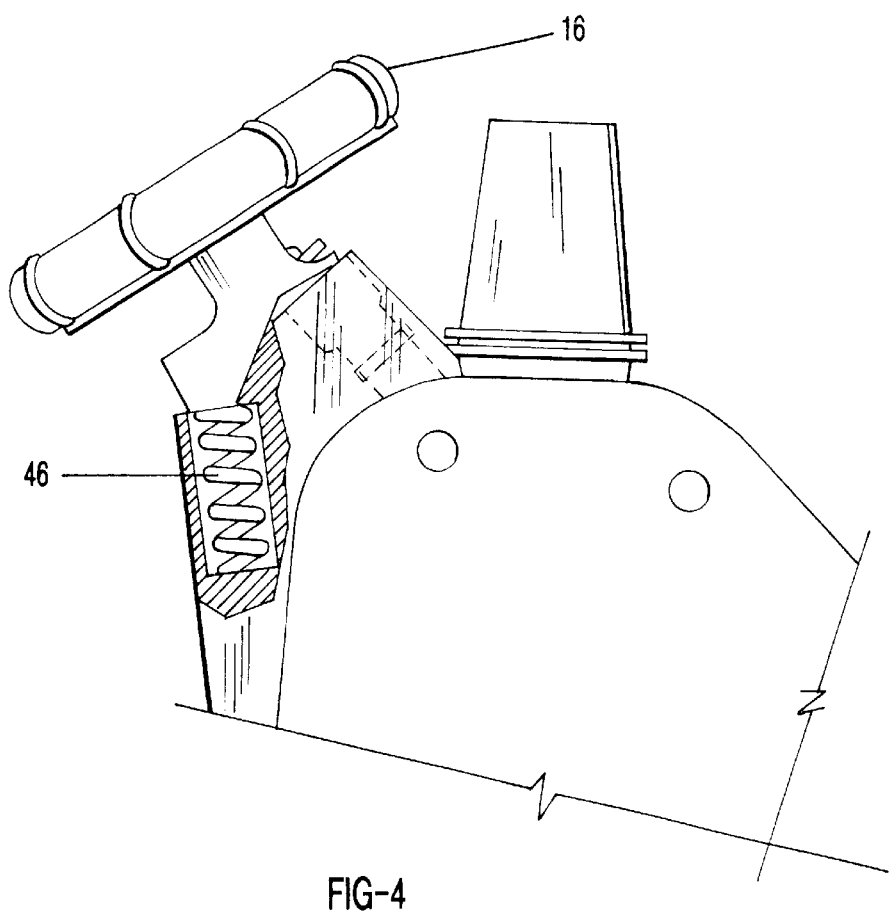
FIG. 4 depicts the preferred deployable life preserver.

FIG. 4 shows the preferred deployable life preserver 16. Life preserver 16 can be mounted in the location as shown or in another appropriate location on the FCRB, and is tethered to the FCRB. Life preserver 16 is spring loaded with a spring 46, or the like, so when initiated, it shoots life preserver 16 into the air and lands in the water for grasping by a rescuee. Deployable life preserver 16 is preferably remotely activated.

Figure 5:
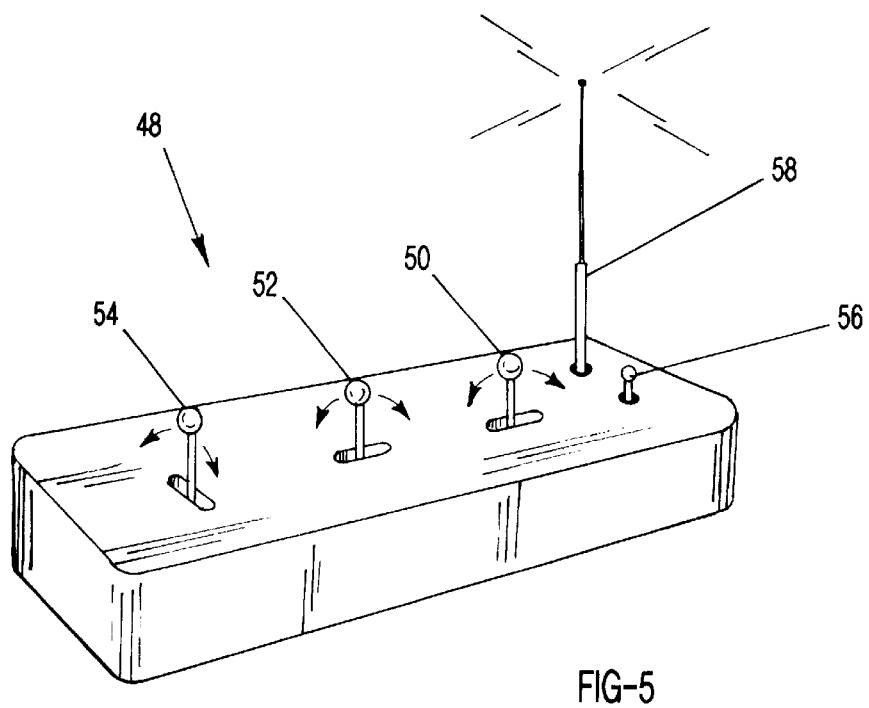
FIG. 5 shows the preferred control box.

All of the remotely controlled systems can be maneuvered utilizing a control box 48, as shown in FIG. 5. Three joy stick devices can be used. Front pitch control joy stick 50, is preferably positioned to move up and down to mimic the movement of the front stabilizer plate. Similarly, rear pitch control joy stick 52 can be positioned to mimic the rear stabilizer plate. Rudder control joy stick 54 is preferably positioned to move from side to side to mimic the movement of the rudder. The control box also preferably has a switch 56 for deploying the life preserver. Additionally, control box 48, has internal electronics and a power system for transmitting the appropriate signals to the FCRB, via antenna 58, for the remote operation of the various onboard systems. The FCRB also has an antenna and control electronics to receive signals from control box 48 and to actuate the appropriate onboard systems (not shown).

The main purpose of the FCRB is to maneuver the FCRB, via control box 48, close to flood victims so they can grasp the handrails 14 and be pulled to safety or in the alternative to have a rescuer aboard the FCRB grasp an incapacitated victim.

Figure 6:
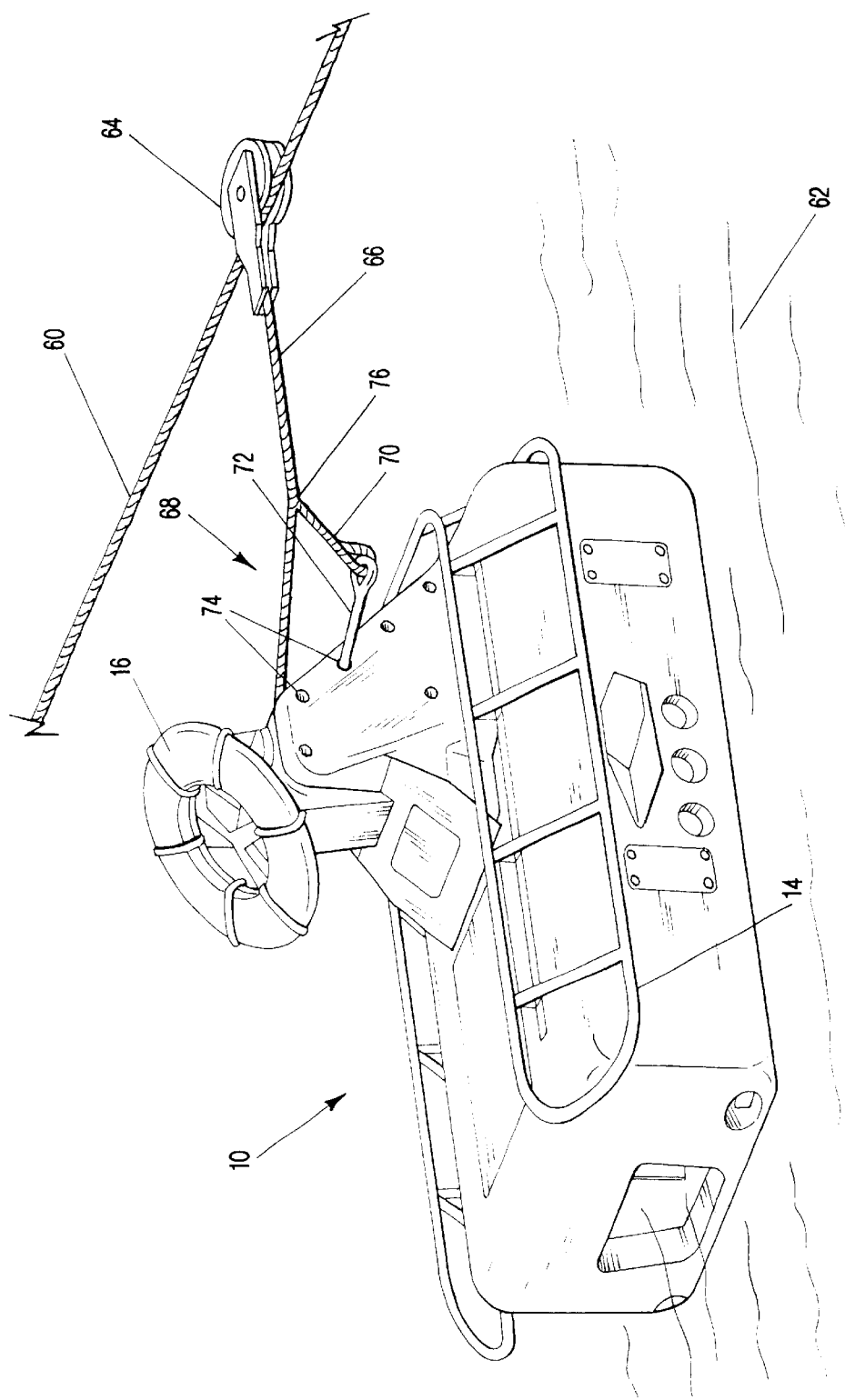
FIG. 6 shows the fast current rescue boat as used in a typical rescue situation.

A typical rescue scenario will further explain the functionality of the present invention. Reference is made to FIGS. 1 through 5 in conjunction with FIG. 6, which depicts a typical rescue situation. Once the FCRB reaches the emergency scene it's deployment depends on the situation confronting the rescuers. One method is to back the FCRB off of the trailer using the FCRB's swivel casters 20 or it can be deployed directly off of the trailer directly into the water (not shown). Alternatively, FCRB 10 can be carried to a suitable launching position using carrying poles (not shown). The poles can be placed through eye bolts, or the like, situated on the top surface of the FCRB. Once the FCRB is ready to be used, the rigging can commence. As shown in FIG. 6, in rescue scenarios involving flooded rivers or canals, main support cable 60 is stretched tautly across the water 62 from bank to bank down river from the flood victim, with the water flowing as shown. A winch can be anchored to any suitable attachment point, i.e., a fire truck, a wrecker, a dump truck, etc. The cable on the winch of a fire truck can also be used as a main support cable 60. The free end of the cable 60 must be anchored to the far side of the river or canal. This can be done with the use of a line throwing gun or simply attaching a light line to the cable 60 and the other end to a suitable projectile and simply tossing the projectile to someone on the other side of the canal or river and pulling the main support cable across. The free end must then be attached to a suitable mooring not unlike the winch end. The winch is then used to tighten the cable as needed. This main support cable 60 has a pulley 64 fixed to a traversing cable 66 that is attached to the FCRB 10. This cable system will keep FCRB 10 at a given point down river from the flood victim, and will allow FCRB 10 to maneuver from side to side in order to affect the rescue of the flood victim.

Main support cable 60 is preferably a ½ inch diameter stranded wire cable rated at 10 (ten) tons breaking strength, long enough to be affixed on each end of the bank to a fixed object or a winch, traversing the water 62 and affixed on the other side of the moving water. Traversing pulley 64 is attached to the main support cable 60 as shown, so traversing pulley 64 moves across the main support cable 60 as the FCRB is maneuvered. Traversing cable 66 is attached to the FCRB 10 on one end, and to traversing pulley 64 on the other end. Traversing cable 66 is preferably a 7/16 inch diameter stranded wire cable rated at seven and one half (7½) tons breaking strength and sufficient length to allow the water craft to maneuver. Traversing cable 66 preferably has anchoring hooks on each end. Preferably, traversing cable 66 is attached to a traversing cable harness assembly 68 as shown in FIG. 6. The preferred cable harness assembly comprises a two legged cable 70 harness attached to each end of a pivot bar 72 which is slid through one of a plurality of pivot/anchor point holes 74 on the FCRB 10. The center 76 of the two legged cable 70 is attached to the traversing cable 66. Alternatively, the traveling harness assembly 68 can be attached to a line pulled by a helicopter or other similar vehicle (not shown).

While the main support cable 60 is being deployed, the traversing cable harness assembly 68 can be attached to the FCRB 10 on one end and to the traversing cable 66 on the other. Once the main support cable 60 is in place, the traversing cable 66 can be attached to the traversing pulley 64, as shown. Once all the rigging is complete, the FCRB 10 is deployed into the water.

The FCRB 10 is remotely maneuvered and controlled using the electronic control box 48 as shown in FIG. 5. The FCRB 10 is maneuvered into the center of the canal or river using the control joy sticks. The life preserver 16 can then be deployed. Once the flood victim is visually located, the FCRB 10 is maneuvered towards the path of the victim as he/she is being swept down river. The FCRB 10 is placed in a location such that the victim can secure himself to one of the handrails 14 on the craft 10 or the life preserver 16 that is trailing behind the craft 10. A rescuer can also be onboard and tethered to the FCRB 10 to affect the rescue if the victim is unable to fend for himself. Once the victim is onboard or at least holding onto the FCRB 10, the operator can maneuver the craft 10 via the remote controls to the edge of the canal or river so that the flood victim can be taken out of the water. The FCRB 10 is then pulled out of the water using the traversing cable 66, placed on a trailer and made ready for another operation.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A water craft apparatus that uses naturally moving water to steer and stabilize said water craft, the apparatus comprising:

a water passage port disposed lengthwise within said water craft for passing the naturally moving water through said water passage port;

wherein the apparatus does not have a motor or other device for propelling water through the water passage port;

a steering rudder disposed within said water passage port and affixed to at least one horizontal wall of said water passage port for steering said water craft using the naturally moving water;

at least one stabilization plate affixed to at least one vertical wall of said water passage port for stabilizing a pitch of said water craft using the naturally moving water; and a water craft anti-rocking stabilization assembly comprising at least one first pressure relief channel comprising a first end disposed on said vertical wall and a second end disposed on a first side of said water craft and at least one second pressure relief channel comprising a first end disposed on said vertical wall and a second end disposed on a second side of said water craft and a first moveable ball disposed within said first pressure relief channel and a second moveable ball disposed within said second pressure relief channel.

2. The invention of claim 1 wherein said steering rudder and said at least one stabilization plate comprise a remotely controlled actuator.

3. The invention of claim 1 wherein said at least one stabilization plate comprises a front stabilization plate and a rear stabilization plate.

4. The invention of claim 1 wherein said at least one first and second pressure relief channels comprise a ball seal.

5. The invention of claim 1 wherein said first and second moveable balls comprise buoyant moveable balls.

6. The invention of claim 1 further comprising a remotely controlled deployable life preserver.

7. The invention of claim 1 further comprising handrails affixed to said water craft.

8. The invention of claim 1 further comprising wheels affixed to an undercarriage of the water craft.

9. A method for steering and stabilizing a water craft with naturally flowing water, the method comprising the steps of:

providing a water passage port disposed lengthwise within the water craft for passing the naturally moving water through the water passage port;

passing water through the water passage port without the use of a motor or other device for propelling water steering the water craft using the naturally moving water comprising a rudder disposed within the water passage port and affixed to at least one horizontal wall of the water passage port;

stabilizing a pitch of the water craft using the naturally moving water comprising at least one stabilization plate affixed to at least one vertical wall of the water passage port; and further stabilizing the water craft with an anti-rocking pressure relief stabilization assembly.

10. The method of claim 9 wherein the step of further stabilizing the water craft with an anti-rocking pressure relief stabilization assembly comprises sealing a moveable ball in a pressure relief channel end by pressure created by the naturally moving water entering into the pressure relief channel.

11. The method of claim 9 further comprising the step of moveably affixing the water craft to a main support cable.

12. The method of claim 9 wherein the steps of steering the water craft and stabilizing the water craft with at least one stabilization plate comprises remotely steering and stabilizing.

13. The method of claim 12 wherein the step of remotely steering and stabilizing comprises remotely controlling the rudder and the at least one stabilization plate.

14. The method of claim 9 wherein the step of stabilizing a pitch of the water craft with at least one stabilization plate comprises stabilizing a front of the water craft with a front stabilization plate and a rear of the water craft with a rear stabilization plate.

* * * * *